(12) United States Patent
Watanabe et al.

(10) Patent No.: US 11,279,239 B2
(45) Date of Patent: Mar. 22, 2022

(54) VEHICLE EQUIPPED WITH A POWER GENERATOR AND A METHOD FOR CONTROLLING POWER GENERATION OF THE POWER GENERATOR ON THE VEHICLE

(71) Applicant: TOYOTA JIDOSHA KABUSHIKI KAISHA, Toyota (JP)

(72) Inventors: Takao Watanabe, Nagakute (JP); Junichi Matsuo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 16/351,665

(22) Filed: Mar. 13, 2019

(65) Prior Publication Data
US 2019/0283613 A1  Sep. 19, 2019

(30) Foreign Application Priority Data
Mar. 15, 2018  (JP) .............................. JP2018-047451

(51) Int. Cl.
*B60L 15/20* (2006.01)
*B60W 30/18* (2012.01)
(Continued)

(52) U.S. Cl.
CPC ............... *B60L 15/20* (2013.01); *B60L 50/75* (2019.02); *B60L 58/40* (2019.02);
(Continued)

(58) Field of Classification Search
None
See application file for complete search history.

(56) References Cited

U.S. PATENT DOCUMENTS 5,748,474 A * 5/1998 Masuda ................ B60K 23/04
180/197
5,765,657 A * 6/1998 Fukumura .............. B60K 28/16
180/197
(Continued)

FOREIGN PATENT DOCUMENTS

JP     2006141104 A  *  6/2006  ............. Y02T 10/72
JP     2009-044817 A    2/2009
(Continued)

*Primary Examiner* — Dale W Hilgendorf
(74) *Attorney, Agent, or Firm* — Sughrue Mion, PLLC (57) ABSTRACT

A power generation amount of a power generator disposed on a vehicle is appropriately controlled by ordering the power generator a required power generation amount so as to control the power generator, driving a drive motor configured to drive a driving wheel of the vehicle using at least part of electric power generated by the power generator according to the required power generation amount, storing at least part of surplus power left in the electric power generated by the power generator in a storage device, detecting a slip of the driving wheel, and, executing reduction processing of a power generation amount for further reducing a required power generation amount that reflects a reduction amount of the electric power for driving the drive motor due to the slip of the driving wheel, if the detected extent of the slip is larger than a predetermined threshold.

6 Claims, 6 Drawing Sheets

(51) Int. Cl.
  *B60L 50/75* (2019.01)
  *B60L 58/40* (2019.01)

(52) U.S. Cl.
  CPC ... *B60W 30/18172* (2013.01); *B60W 2520/10* (2013.01); *B60W 2520/26* (2013.01); *B60W 2520/28* (2013.01); *B60Y 2200/91* (2013.01); *B60Y 2400/112* (2013.01); *B60Y 2400/202* (2013.01)

(56) References Cited

U.S. PATENT DOCUMENTS

| | | | | |
|---|---|---|---|---|
| 6,460,647 | B1* | 10/2002 | Schmitt | B60K 28/16 180/197 |
| 7,911,183 | B2* | 3/2011 | Mizuno | B60L 58/34 320/134 |
| 8,170,768 | B2* | 5/2012 | Fujimoto | B60T 8/17616 701/90 |
| 8,335,625 | B2* | 12/2012 | Yamaguchi | B60L 3/102 701/82 |
| 2002/0042671 | A1* | 4/2002 | Chen | B60T 8/1764 701/41 |
| 2003/0014177 | A1* | 1/2003 | Herb | B60K 28/16 701/82 |
| 2004/0140174 | A1* | 7/2004 | Kano | B60W 10/18 192/104 R |
| 2005/0278104 | A1* | 12/2005 | Masuda | B60W 20/15 701/69 |
| 2016/0129901 | A1* | 5/2016 | Migita | B60W 10/08 701/22 |
| 2017/0008505 | A1* | 1/2017 | Park | B60W 20/11 |
| 2021/0001721 | A1* | 1/2021 | Yamazaki | B60W 50/14 |

FOREIGN PATENT DOCUMENTS

| | | |
|---|---|---|
| JP | 2010-104094 A | 5/2010 |
| JP | 2012-045996 A | 3/2012 |

* cited by examiner

VEHICLE EQUIPPED WITH A POWER GENERATOR AND A METHOD FOR CONTROLLING POWER GENERATION OF THE POWER GENERATOR ON THE VEHICLE

CROSS-REFERENCE TO RELATED APPLICATION

The present application claims priority from Japanese application P2018-47451 filed on Mar. 15, 2018, the content of which is hereby incorporated by reference into this application.

BACKGROUND

1. Field

The present disclosure relates to controlling power generation of a power generator disposed on a vehicle.

2. Related Art

A vehicle equipped with a power generator such as a fuel cell vehicle and a series hybrid vehicle is well-known. This kind of vehicle includes the power generator, a chargeable and dischargeable battery, and a load such as a drive motor for running. The power generator such as the fuel cell is operated based on electric power required to drive the vehicle and generated electric power is supplied to the load such as the drive motor. If the generated power amount of the power generator exceeds the electric power amount consumed by the load such as the drive motor, surplus power is used to charge the battery.

And now, if a slip occurs in the vehicle, a load applied to the drive motor decreases. Thus, the electric power amount to be supplied to the drive motor is reduced as disclosed in JP 2009-044817A. As a result, a wheel spin is suppressed and wasteful consumption of the electric power is also suppressed.

However, since changes in the power consumption due to the occurrence of the slip and changes in the generated power amount of the power generator such as the fuel cell do not always synchronize, even if the control disclosed in JP 2009-044817A is performed, a power balance as a whole vehicle is temporarily lost. If the electric power amount supplied to the drive motor is reduced, surplus power is left. At this time, if the SOC (State of Charge) of the battery is almost full, the surplus power may not be accepted for charging the battery. Moreover, even if the SOC of the battery is not close to full, the battery has a rating of a chargeable amount per unit time, which may make it impossible to accept all the surplus power for charging the battery. The latter problem tends to occur especially when battery temperature is low.

SUMMARY

The present disclosure may be implemented as aspects or application examples described below.

(1) A vehicle is provided as an aspect. The vehicle comprises a power generator configured to generate electric power using fuel, a power generation controller configured to order the power generator a required power generation amount so as to control the power generator, a drive motor that is driven by at least part of the electric power generated by the power generator and configured to drive a driving wheel of the vehicle, a storage device configured to store surplus power left in the electric power generated by the power generator, and a slip detector configured to detect an extent of a slip of the driving wheel. The power generation controller executes reduction processing of a power generation amount for further reducing a required power generation amount that reflects a reduction amount of the electric power for driving the drive motor due to the slip of the driving wheel, when the detected extent of the slip is larger than a predetermined threshold. Therefore, as to the vehicle described above, since the required power generation amount that reflects the reduction amount of the electric power for driving the drive motor due to the slip of the driving wheel is further reduced, it is possible to suppress generation of a problem that an actual power generation amount becomes too much due to a delay in a response existing in the power generation of the power generator in response to the required power generation amount, when the detected extent of the slip is larger than the predetermined threshold. The processing is referred to as the reduction processing of the power generation amount.

(2) In such a vehicle, as the reduction processing of the power generation amount, the power generation controller may calculate the reduction amount of the electric power required to drive the drive motor according to the detected extent of the slip, and subtracts an electric power amount exceeding the calculated reduction amount from the required power generation amount. It can more certainly suppress the generation of the problem that the generated power amount becomes too much.

(3) In this vehicle, the power generation controller may calculate a reduction amount of the required power generation amount from the power generator based on the reduction amount of the electric power required to drive the drive motor using an overall transfer function determined by a transfer function for an appearance as actual torque of the drive motor to the reduction amount of the electric power for the drive motor and a transfer function for an appearance as an actual power generation amount of the power generator to the reduction amount of the required power generation amount from the power generator. In this regard, since the reduction amount of the required power generation amount from the power generator is calculated by the overall transfer function, it is possible to calculate the required power generation amount coping with the delay in the control in the power generator. As a result, the power generation amount can be made closer to an amount that is neither too much nor too little.

(4) This kind of vehicle may comprise a charging capacity detector configured to obtain a charging capacity available in the storage device, and the power generation controller may execute the reduction processing of the power generation amount when the charging capacity is smaller than a predetermined threshold. Accordingly, it is not necessary to execute the reduction processing of the power generation amount, when the charging capacity of the storage device is large, which makes the processing simpler. However, of course, the reduction processing of the power generation amount may be executed regardless of the charging capacity of the storage device. Alternatively, the threshold used to determine whether the surplus power is larger than the charging capacity may be defined in consideration of time deterioration or the like of the storage device.

(5) In such a vehicle, the power generation controller may execute the reduction processing of the power generation amount for at least one of following time periods: [1] for a time period that the slip detector detects the slip of the wheel; [2] for a predetermined time period after the slip detector detects the slip of the wheel; and [3] for a time period when it is predicted that the slip detector will detect the slip of the wheel. This is because a temporary decrease of the electric power amount required for the drive motor due to the slip is expected for these time periods. The prediction of the occurrence of the slip may be made by changes of a slip ratio over time, or by measuring a friction coefficient of a road surface by a dedicated detection wheel or the like.

(6) In such a vehicle, the slip detector may comprise a vehicle body speed detector configured to detect vehicle body speed of the vehicle and a rotational speed detector configured to detect rotational speed of the driving wheel, and the extent of the slip may be obtained from a difference between the rotational speed of the driving wheel consistent with the detected vehicle body speed and the detected rotational speed of the driving wheel. With this configuration, the occurrence of the slip in the vehicle is accurately detected. The occurrence of the slip may be determined based on the slip ratio or the difference between the numbers of revolutions of the driving wheel and the driven wheel.

(7) The power generator may be any one of a fuel cell and a generator driven by fuel combustion. The power generator is assumed to be a configuration using electrochemical reaction such as a fuel cell or a configuration driven using combustion energy such as a generator driven by an internal-combustion engine. That is because it can reduce the surplus power to be generated due to the delay in the response when the response to the required power generation amount given to the power generator is delayed longer than a predetermined time.

As another aspect, it may be implemented as a method for controlling the power generation amount of the power generator disposed on the vehicle. Alternatively, it may be implemented as a method for producing the vehicle equipped with the power generator or a method for generating the electric power by the power generator on the vehicle.

DESCRIPTION OF THE PREFERRED EMBODIMENTS

A. Hardware Configuration of Embodiments

Figure 1:
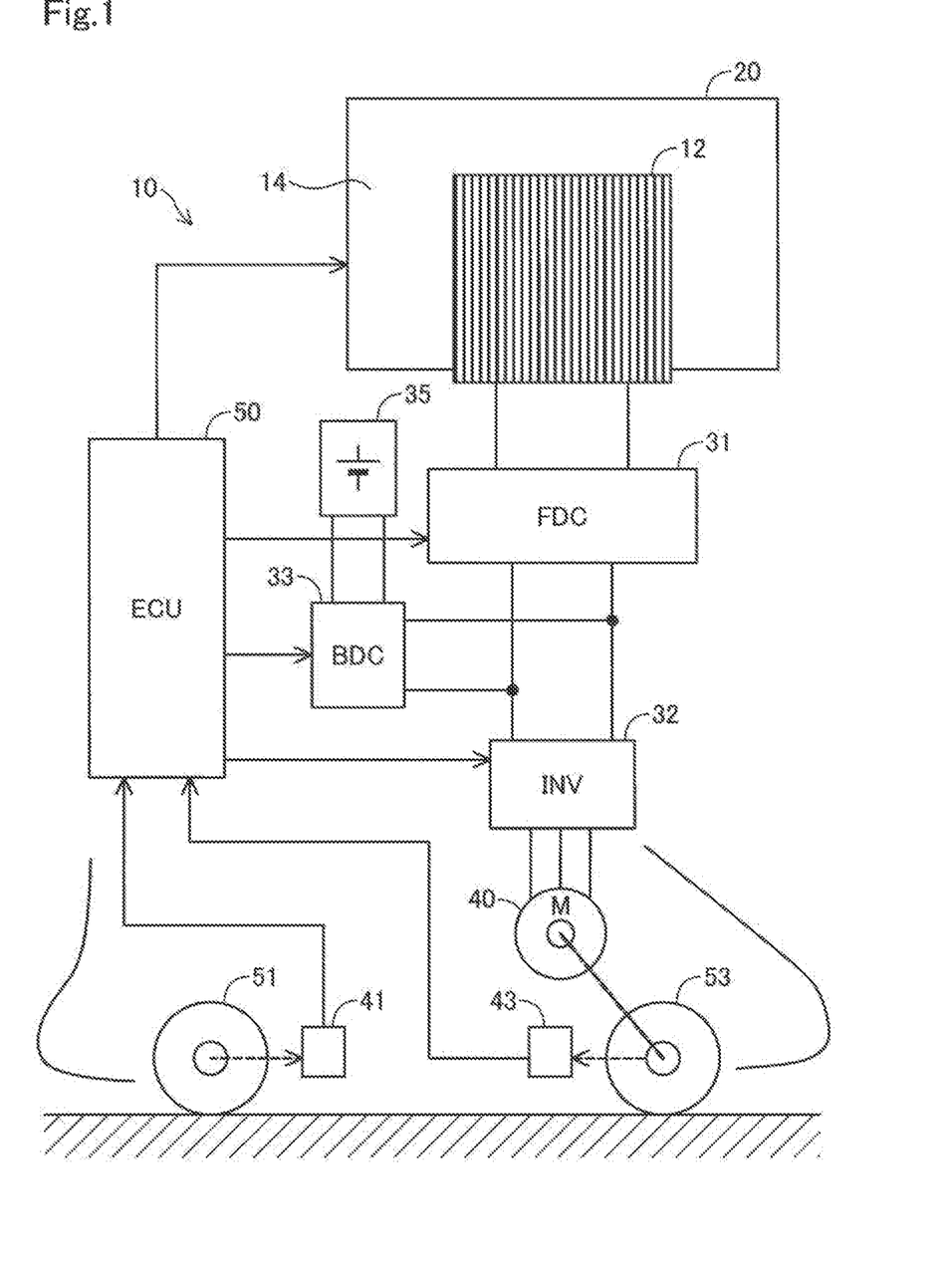
FIG. 1 is a schematic block diagram of a vehicle according to embodiments.

FIG. 1 is a schematic block diagram illustrating a hardware configuration of a fuel cell vehicle (hereinafter simply referred to as "vehicle") 10 that is common to each embodiment described below. The vehicle 10 is equipped with a fuel cell 20 as a power generator and at least part of electric power generated by the fuel cell 20 is used to drive a drive motor 40 for driving the vehicle. The vehicle 10 is provided with a driven wheel 51 and a driving wheel 53 and a driving force of the drive motor 40 is transmitted to the driving wheel 53 via an unshown power transmitting mechanism so as to be used to drive the vehicle.

The fuel cell 20 includes a fuel cell stack 12 in which a large number of cells for power generation are stacked. The fuel cell stack 12 is provided with a fuel cell operation unit 14 that includes such as a gas supply and exhaust mechanism to supply and exhaust hydrogen gas as fuel gas and air as oxidizing gas, and a cooling mechanism to cool or warm up the fuel cell stack 12. The fuel cell operation unit 14 is controlled by an ECU 50 as a power generation controller. Since a configuration of the fuel cell operation unit 14 is well-known, detailed description is omitted.

The ECU 50 instructs the fuel cell operation unit 14 so that the fuel cell 20 generates electric power of a required power generation amount and performs control in extracting the electric power generated by the fuel cell 20. A power line of the fuel cell 20 is connected to a fuel cell converter (also referred to as FDC) 31 and boosted electric power is output to an inverter (also referred to as INV) 32 configured to drive the drive motor 40. The inverter 32 is controlled by the ECU 50 so as to control intensity of three-phase alternating current of the drive motor 40. The drive motor 40 receives the electric power from the inverter 32 and gives the driving force that is necessary to accelerate the vehicle 10 to the driving wheel 53.

A power line connecting the fuel cell converter 31 and the inverter 32 is also connected to a battery converter (also referred to as BDC). A battery converter 33 is configured as a bidirectional DC/DC converter and deals with the electric power to and from a battery 35 connected to the battery converter 33 as a storage device and the fuel cell 20. More specifically, if there is surplus in the electric power generated by the fuel cell stack 12 after the generated electric power is used to drive the drive motor 40 or unshown auxiliary machinery (such as a compressor in the fuel cell operation unit 14), the battery converter 33 uses the surplus to charge the battery 35. If there is a temporary shortage in the electric power required to drive the drive motor 40, the battery converter 33 supplies the shortage by discharging the battery 35.

In order to control the electric power as described above, the ECU 50 is connected to the fuel cell operation unit 14, the fuel cell converter 31, the inverter 32, the battery converter 33 and so on and controls an operational state of each device. The ECU 50 receives input signals emitted from various sensors to perform the control described above. For the power generation amount control described later, FIG. 1 shows only a second rotational speed sensor 43 configured to detect rotational speed of the driving wheel 53 and a first rotational speed sensor 41 configured to detect rotational speed of the driven wheel 51 that is rotated due to the travel of the vehicle 10, though various other sensors are connected to the ECU 50. The rotational speed means the number of revolutions per minute (rpm).

The ECU 50 controls the fuel cell operation unit 14 and so forth based on the signals from these sensors. More specifically, the ECU 50 performs the control described below.

[1] Control of the fuel cell operation unit 14 so as to put the fuel cell 20 into a responsive state to the request for the electric power by the whole vehicle 10;
[2] Control of the fuel cell converter 31 so as to obtain the required electric power amount from the fuel cell 20;
[3] Control of the inverter 32 so as to make the drive motor 40 output torque to accelerate or decelerate the vehicle 10;
[4] Control of the battery converter 33 so as to deal with the surplus or shortage of the electric power to and from the battery 35; and
[5] Control of operations of the unshown auxiliary machinery.

B. Power Generation Amount Control According to First Embodiment

The control of the power generation amount performed by the ECU 50 is described with the hardware configuration described above. As described above, the ECU 50 controls a supply-demand relationship in the whole vehicle 10 from the power generation by the fuel cell 20 to a charge and discharge state of the battery 35 so as to keep balance. As part of the control described above, the power generation amount control when the slip occurs in the vehicle 10 is described hereinafter.

First of all, a description of the slip of the vehicle 10 is provided below. As previously described, the driving wheel 53 receives the driving force from the drive motor 40 so as to rotate, which accelerates the vehicle. Meanwhile, the driven wheel 51 does not receive the driving force from the drive motor 40, but it rotates due to the travel of the vehicle 10. Thus, the rotational speed of the driven wheel 51 corresponds to vehicle body speed (vehicle speed). The driving wheel 53 rotates at higher number of revolutions than that of the driven wheel 51 when accelerating. By controlling a difference between the numbers of revolutions of the driving wheel 53 and the driven wheel 51 to be in an appropriate range, the driving wheel 53 grips a road surface and the driving torque of the drive motor 40 is transmitted without any waste, so that the vehicle 10 is accelerated. If the number of revolutions of the driving wheel 53 becomes excessively higher than that of the driven wheel 51, the driving wheel 53 spins. It is the same with braking. That is, if the difference between the number of revolutions of the wheel corresponding to the vehicle speed and the actual number of revolutions of the wheel is in a certain range, the wheel used to brake grips on the road surface and appropriate braking force is applied to the vehicle 10. Meanwhile, if the rotational speed of the wheel becomes excessively low relative to the vehicle speed, the wheel is in a sliding state. Generally speaking, the slip of the vehicle 10 is a state that the rotational speed of the wheel deviates from the vehicle speed both in accelerating and decelerating. When the vehicle 10 is accelerating by the power of the drive motor 40, the slip is the state that the number of revolutions of the driving wheel 53 is excessively higher than that of the driven wheel 51. When the vehicle 10 is decelerating by regeneration of the drive motor 40, the slip is the state that the number of revolutions of the driving wheel 53 demonstrating the braking force for the regeneration is excessively lower than that of the driven wheel 51 that is not braking.

Figure 2:
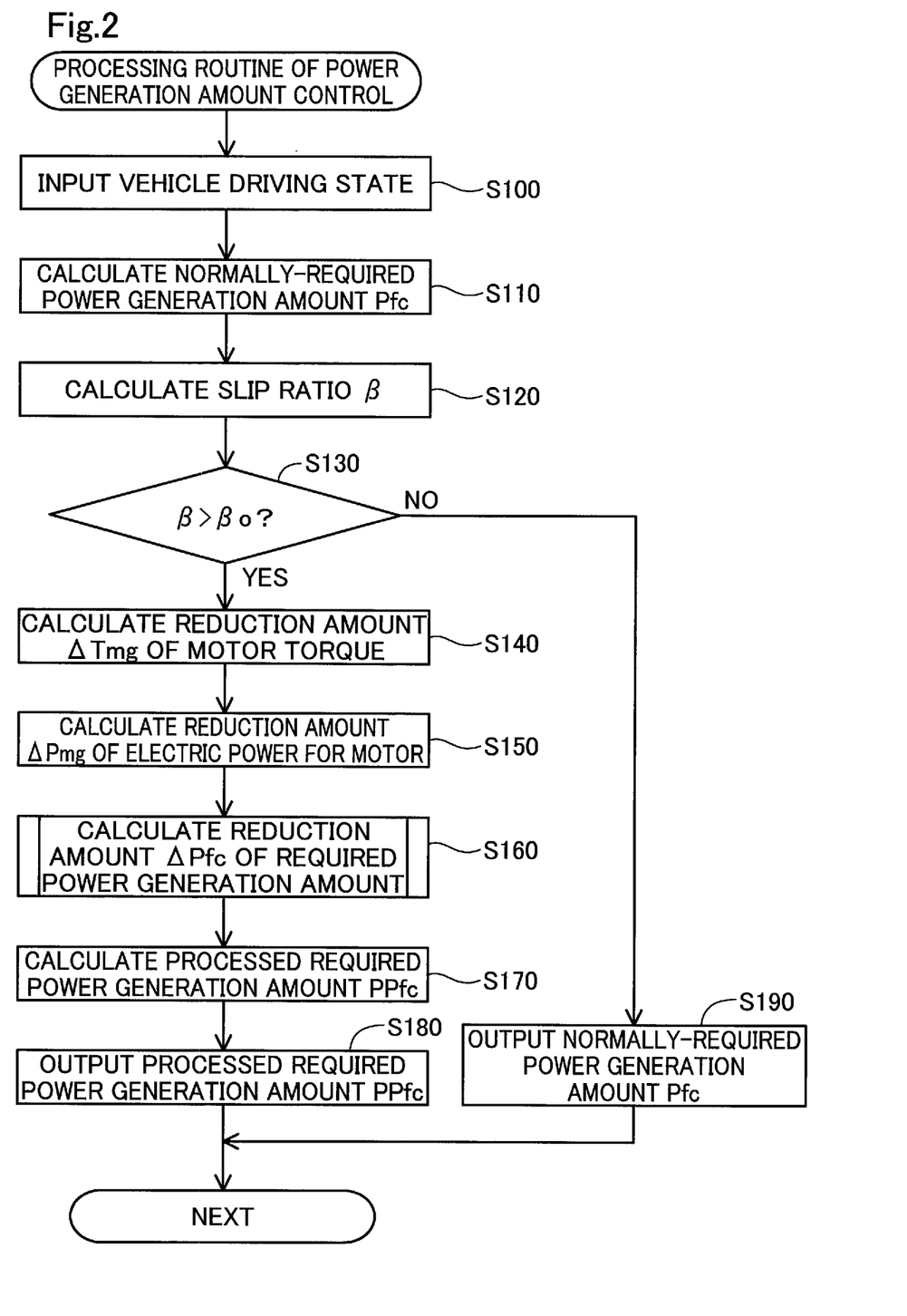
FIG. 2 is a flowchart illustrating a processing routine of power generation amount control in the vehicle according to a first embodiment.

FIG. 2 is a flowchart illustrating a processing routine of power generation amount control according to a first embodiment. The processing illustrated in FIG. 2 is repeatedly executed at predetermined intervals by the ECU 50 while the vehicle 10 is travelling. The processing of a step S130 and subsequent steps in the flowchart is the reduction processing of the power generation amount. As described above, the control of the power generation amount is performed in decelerating as well as in accelerating. However, in order to facilitate the understanding, the description is hereinafter given on the assumption that the driving wheel 53 is rotated by the driving force of the drive motor 40.

Once the processing routine shown in FIG. 2 is started, the ECU 50 reads the signals from the various sensors so as to input a driving state of the vehicle at first (step S100). The driving state of the vehicle includes the number of revolutions of the driven wheel 51 detected by the first rotational speed sensor 41, that is, the vehicle speed, the number of revolutions of the driving wheel 53 detected by the second rotational speed sensor 43, and so forth.

Next, the ECU 50 calculates the power generation amount required from the fuel cell 20 in consideration of the driving state of the vehicle (step S110) that is read in the preceding step. The calculated power generation amount is referred to as a normally-required power generation amount Pfc that means the electric power amount required from the fuel cell 20 at normal time without any slips.

Then, the ECU 50 calculates a slip ratio ß (step S120). The slip ratio ß is a percentage of the difference between the vehicle speed (the rotational speed Nv of the driven wheel 51 in this case) and the rotational speed Nt of the driving wheel 53 against the vehicle speed. It is represented by a formula (1) below:

$$ß = 100 \times |Nt - Nv|/Nv \qquad (1)$$

An absolute value of the difference between both rotational speeds is used because it is common to obtain the slip ratio as a positive value even in a case of decelerating. The processing for calculating the slip ratio ß by the ECU 50 is a configuration as the slip detector.

Then, the ECU 50 determines whether the obtained slip ratio ß is larger than a predetermined threshold Bo (step S130). As described above, in order to appropriately accelerate or decelerate the vehicle 10, the slip ratio needs to be in an appropriate range (for example, 15 to 30%). Accordingly, the threshold Bo is predefined at a value out of this range. The thresholds Bo in accelerating and in decelerating may be set at different values. In addition, the determination in the step S130 may be made using the difference between the rotational speeds of the driving wheel 53 and the driven wheel 51 instead of the slip ratio. Alternatively, it is possible to use the vehicle speed that is detected by a ground speed sensor using a principle such as the Doppler effect instead of using the rotational speed of the driven wheel 51 as the vehicle speed.

If the slip ratio ß is higher than the threshold Bo, processing for calculating a reduction amount of the torque of the drive motor 40 is executed (step S140). The reduction amount ΔTmg is calculated as an amount to be reduced from the torque of the drive motor 40 so that the torque of the drive motor 40 falls down to the torque equivalent to that of the driving wheel 53 that has decreased due to the spin of the driving wheel 53 caused when the slip ratio ß has exceeded the threshold Bo. Note that an amount regarded as the reduction amount Δ in both the torque and the electric power in the following description is an amount with a minus sign.

Subsequently, a reduction amount ΔPmg of the electric power for driving the motor that corresponds to the calculated reduction amount ΔTmg of the motor torque is calculated (step S150). This calculation is processing for converting the reduction amount ΔTmg of the torque into the reduction amount ΔPmg of the electric power for driving the motor using efficiency ωmg of the drive motor 40. It is represented by a formula (2) below:

$$\Delta Pmg = \Delta Tmg \times \omega mg \quad (2)$$

The calculated reduction amount ΔPmg of the electric power is an electric power amount actually reduced due to the spin of the driving wheel 53 and it corresponds to a reduction amount reflecting a reduction amount of the required power generation amount from the fuel cell 20 according to the slip.

Next, processing for calculating a reduction amount ΔPfc of a required power generation amount based on this reduction amount ΔPmg of the electric power is executed (step S160). This processing is executed in the following manner in the first embodiment. Firstly, a basic reduction amount ΔPBfc corresponding to the reduction amount ΔPmg of the electric power based on the slip of the driving wheel 53 is calculated. It is simply calculated by the following formula (3):

$$\Delta PBfc = \Delta Pmg \quad (3)$$

Secondly, a surplus reduction amount ΔPSfc due to the occurrence of the slip is calculated. The surplus reduction amount ΔPSfc further increases the reduction amount calculated as the basic reduction amount ΔPBfc, and it is calculated by the following formula (4) using a surplus ratio Y (0<Y<1):

$$\Delta PSfc = Y \times \Delta PBfc \quad (4)$$

Lastly, the reduction amount ΔPfc of the required power generation amount is calculated by the following formula (5):

$$\Delta Pfc = \Delta PBfc + \Delta PSfc \quad (5)$$

The formula obtained as described above is rearranged using the surplus ratio Y into the following formula (6):

$$\Delta Pfc = (1+Y) \times \Delta PBfc \quad (6)$$

It is understood that y is set as the surplus ratio. That is to say, the calculation in the step S160 corresponds to the calculation for the reduction amount ΔPfc of the required power generation amount by which the required power generation amount from the fuel cell 20 is reduced more than by the reduction amount ΔPBfc of the required power generation amount that is consistent with the reduction amount ΔPmg in the electric power to be supplied to the drive motor 40 incurred by the slip of the driving wheel 53.

After the reduction amount ΔPfc of the required power generation amount is obtained by the step S160, processing for calculating a processed required power generation amount PPfc is executed (step S170), in which the processed required power generation amount PPfc is a resultant of the reduction processing of the required power generation amount from the fuel cell 20 using the reduction amount ΔPfc of the required power generation amount. It is represented by a formula (7) below:

$$PPfc = Pfc + \Delta Pfc \quad (7)$$

In the above formula, Pfc is the normally-required power generation amount that is obtained by the step S110, and it corresponds to the required power generation amount without any change due to a slip amount.

After the processed required power generation amount PPfc is obtained, control signals based on the processed required power generation amount PPfc are output to the fuel cell operation unit 14, the fuel cell converter 31, the battery converter 33 and so on (step S180). Meanwhile, if it is determined that the slip ratio δ is equal to or lower than the threshold δo in the step S130, control signals based on the previously calculated normally-required power generation amount Pfc are similarly output to the fuel cell operation unit 14 and so on (step S190). After the processing of the step S180 or the step S190, the processing exits to "NEXT" and the routine is terminated for the moment.

Figure 3:
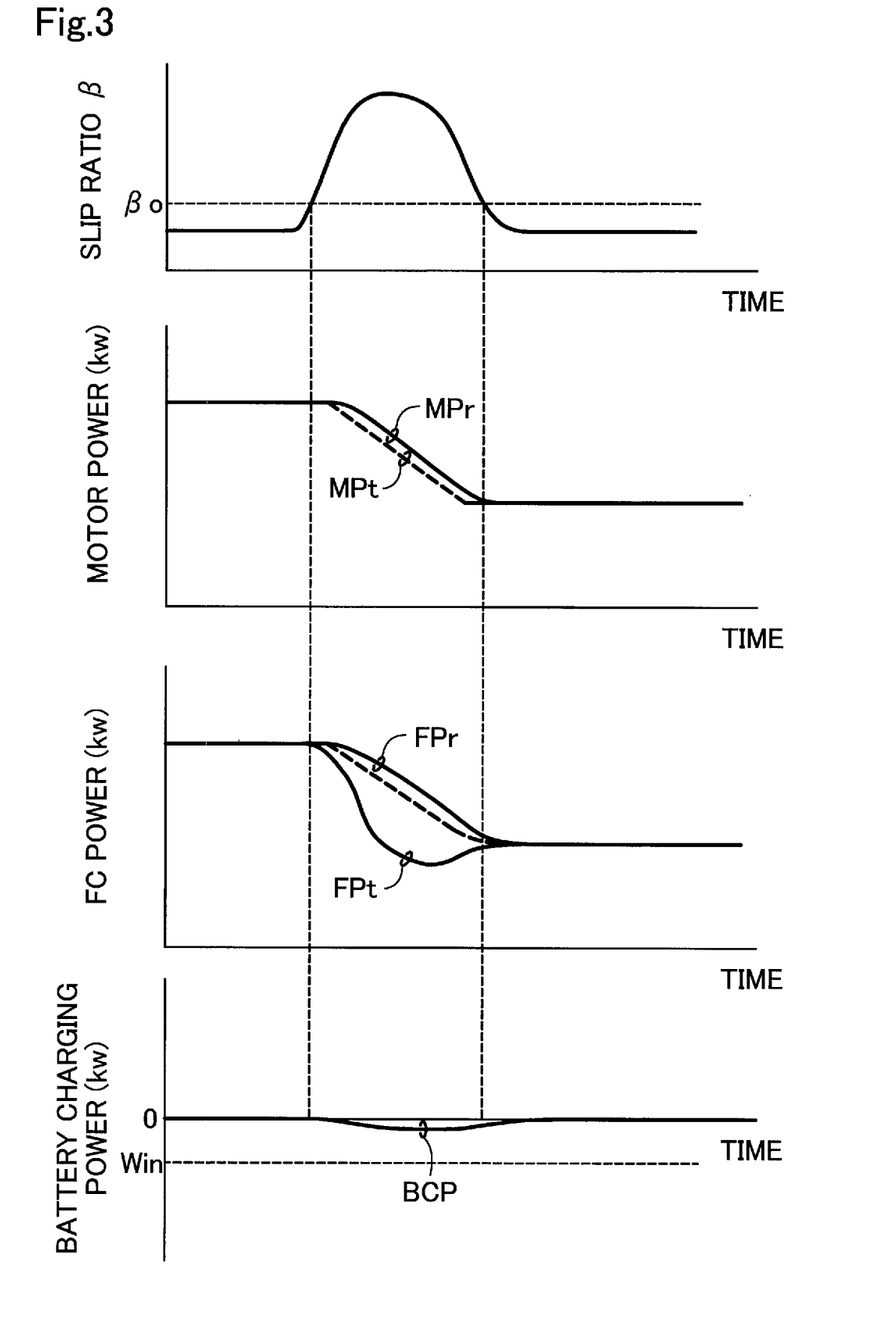
FIG. 3 is an example of graphs respectively exemplifying power transition of each part when a slip occurs in the first embodiment.
Figure 4:
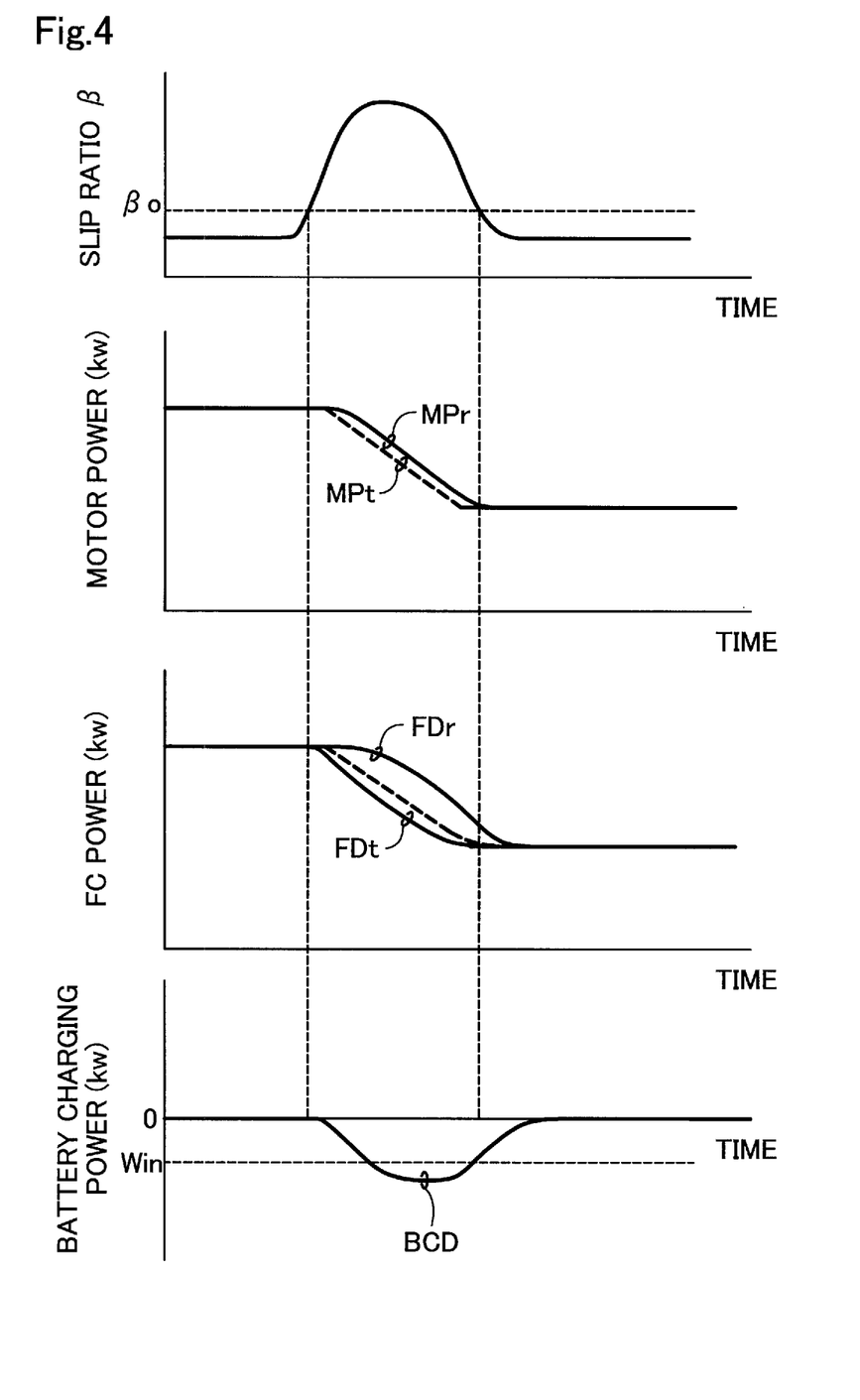
FIG. 4 is an example of graphs respectively exemplifying power transition of each part when a slip occurs in a comparative example.

Changes of the electric power amount due to the above-described processing routine of the power generation amount control are described in reference to FIG. 3 and FIG. 4. FIG. 3 is a set of graphs illustrating how the electric power amount is controlled in this embodiment. As shown in the uppermost graph, when the grip of the driving wheel 53 on the road surface decreases due to a road surface condition in accelerating and the slip ratio δ exceeds the threshold δo, the torque of the drive motor 40 decreases, so that the power output by the drive motor 40, that is, the electric power amount to be supplied to the drive motor 40 decreases. This is shown as a decrease of motor power in FIG. 3. As shown in FIG. 3, an objective power MPt to be output to the drive motor 40 is reduced by the reduction amount ΔPmg of the electric power for the motor described above. At this time, since there is a delay in the control, the electric power actually output to the drive motor 40 is reduced with a delay compared with the objective power MPt as shown with a solid line MPr.

In this embodiment, according to the reduction amount of the motor power, that is, the reduction amount ΔPmg of the electric power for the motor, the reduction amount ΔPfc of the required power generation amount is calculated adding the above-described surplus reduction amount ΔPSfc, and the required power generation amount from the fuel cell 20 is reduced by the reduction amount ΔPfc. That is to say, the electric power amount is reduced not only by the basic reduction amount ΔPBfc based on the torque of the drive motor 40 but also by a result of the formula $$\Delta Pfc = \Delta PBfc + \Delta PSfc$$

Based on this, the required power generation amount output to the fuel cell operation unit 14 becomes the processed required power generation amount PPfc. This is shown with a solid line FPt in the graph of FC power in FIG. 3. As a result, an actual power generation amount that is actually generated by the fuel cell 20 shifts as shown with a solid line FPr in FIG. 3. Since the actual power generation amount FPr well follows an electric power amount that is no longer necessary to be output to the drive motor 40 due to the occurrence of the slip, not much surplus power is generated in view of the whole vehicle 10. Accordingly, even if the surplus power is generated due to the delay in the control and accepted by the battery 35 for charging, charging power BCP used to charge the battery 35 stays in a little amount so as not to exceed a charging capacity Win available in the battery 35 as shown in the lowermost graph in FIG. 3.

The control of the electric power amount described above is enabled because, when the reduction amount ΔPmg of the electric power for the motor is generated by the slip of the driving wheel 53, the processed required power generation amount PPfc is calculated so as to increase the reduction amount ΔPmg in the calculation for the required power generation amount from the fuel cell 20 and then output.

A case without the surplus reduction amount ΔPSfc is shown in FIG. 4 for comparison. In an example of the control shown in FIG. 4, similarly to that in FIG. 3, an order value of fuel cell power is reduced by the reduction amount of the motor power when the slip ratio δ exceeds the threshold δo. However, the processed required power generation amount is obtained only by subtracting the basic reduction amount ΔPBfc without obtaining the surplus reduction amount ΔPSfc. Thus, the objective power FDt of the fuel cell 20 is only reduced correspondingly to the reduction amount of the motor power as shown in FIG. 4. As a result, since there is the delay in the control of the fuel cell operation unit 14, the reduction of the actual power generation amount FDr of the fuel cell 20 is delayed and surplus power BCD is generated. The surplus power BCD may exceed the charging capacity Win available in the battery 35. Practically speaking, if the surplus power exceeds the charging capacity Win available in the battery 35, it cannot be used to charge the battery 35. Thus, unshown auxiliary machinery such as a compressor for providing air that is disposed in the fuel cell operation unit 14 is operated at high rotational speeds so as to consume the surplus power that cannot be used to charge the battery. In this case, since surplus air generated by operating the compressor at high rotational speeds is not to be supplied to the fuel cell stack 12, it is necessary to execute processing that a valve disposed in the fuel cell operation unit 14 is opened to discharge the air without making it go through the fuel cell stack 12. Consequently, the efficiency as the whole vehicle 10 is deteriorated. So-called fuel efficiency is deteriorated. As shown in FIG. 3, in the vehicle according to the first embodiment, the generation of such surplus power is suppressed because the required power generation amount from the fuel cell 20 is reduced by the calculated surplus reduction amount ΔPSfc as well in the above-described processing (FIG. 2), which prevents wasteful consumption of the electric power. Accordingly, the deterioration of the efficiency (fuel efficiency) as the whole vehicle 10 is suppressed.

C. Power Generation Control According to Second Embodiment

Next, the power generation control according to a second embodiment is described hereinafter. The vehicle 10 according to the second embodiment has the hardware configuration shown in FIG. 1 and part of the processing routine of the power generation amount control is different from that of the first embodiment. In the second embodiment, the calculation of the reduction amount ΔPfc of the required power generation amount corresponding to the step S160 in FIG. 2 is performed by the following formula (8):

$$\Delta Pfc = \Delta Pmg \times (\tau fcs+1)/(\tau mgs+1) \quad (8)$$

In the above formula, τfc is a transfer function for an appearance as the actual power generation amount of the fuel cell 20 to the reduction amount of the required power generation amount from the fuel cell 20 as the power generator. Similarly, τmg is a transfer function for an appearance as the actual torque of the drive motor 40 to the reduction amount of the electric power for the drive motor 40. "s" is a parameter of the Laplace transformation. Accordingly, in the second embodiment, the reduction amount ΔPfc of the required power generation amount from the fuel cell 20 is directly calculated from the reduction amount ΔPmg of the electric power required to drive the drive motor 40.

The second embodiment exhibits the same effect as that of the first embodiment. In addition, since the reduction amount ΔPfc of the required power generation amount is obtained using an overall transfer function (τfc·s+1)/(τmg·s+1) that is determined by the transfer function τfc for the appearance as the actual power generation amount of the fuel cell 20 to the reduction amount of the required power generation amount from the fuel cell 20 and the transfer function τmg for the appearance as the actual torque of the drive motor 40 to the reduction amount of the electric power for the drive motor 40, the calculation can be made simpler. Moreover, once each of the transfer functions is accurately determined, the reduction amount coping with the delay in the response can be obtained easily.

D. Power Generation Control According to Third Embodiment

Next, the power generation control according to a third embodiment is described hereinafter. The vehicle 10 according to the third embodiment has the hardware configuration shown in FIG. 1 and part of the processing routine of the power generation amount control is different from that of the first and second embodiments. In the third embodiment, the reduction amount ΔPfc of the required power generation amount calculated in the step S160 in FIG. 2 is calculated by the processing shown in FIG. 5. The processing other than the step S160 is the same as that of the first and second embodiments.

Figure 5:
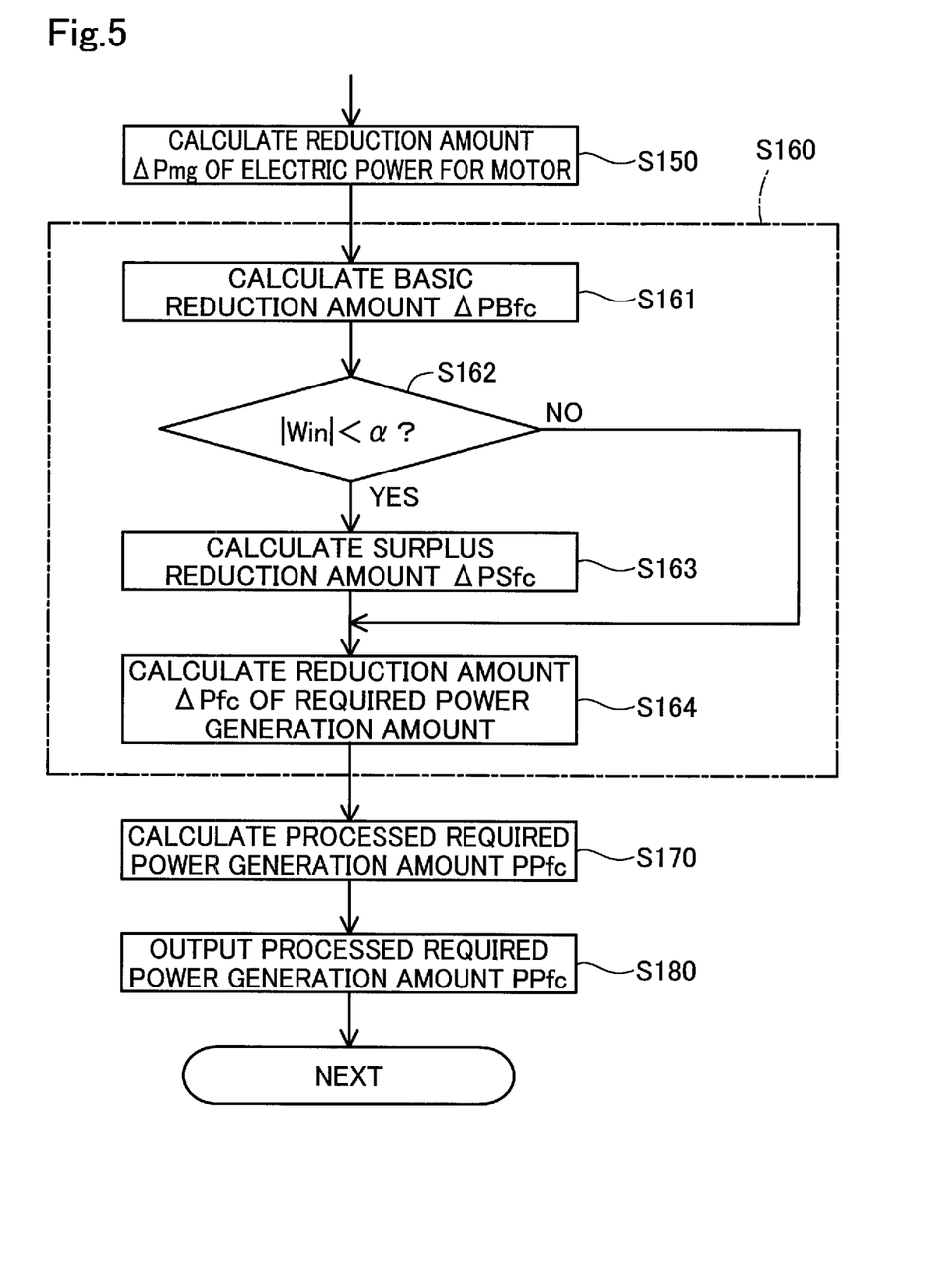
FIG. 5 is a flowchart illustrating a major part of a processing routine of power generation amount control in the vehicle according to a third embodiment.

In the third embodiment, after obtaining the reduction amount ΔPmg of the electric power for the motor (step S150), the processing for obtaining the reduction amount ΔPfc of the required power generation amount (step S160) is performed as described below. Firstly, the basic reduction amount ΔPBfc is calculated (step S161). The basic reduction amount ΔPBfc is obtained in the same way as that of the first embodiment by the formula (3) described above using the reduction amount ΔPmg of the electric power for the motor.

Secondly, it is determined whether the absolute value of the charging capacity Win indicating an available amount in the battery 35 is smaller than a threshold a (step S162). That the absolute value of the charging capacity Win is smaller than the threshold a means that an available amount in the battery 35 is so small that the battery cannot take the surplus power generated by the occurrence of the slip. The charging capacity Win can be learned by the ECU 50 managing the SOC of the battery 35. This configuration corresponds to the charging capacity detector. Accordingly, if the absolute value of the charging capacity Win indicating the available amount in the battery 35 is smaller than the threshold a, the processing for calculating the surplus reduction amount ΔPSfc is executed (step S163), as in the first embodiment. The surplus reduction amount ΔPSfc is obtained by the formula (4) described above. Meanwhile, if the absolute value of the charging capacity Win is equal to or larger than the threshold a, the processing for calculating the surplus reduction amount ΔPSfc (step S163) is not executed. In this case, the surplus reduction amount ΔPSfc is set at 0.

Lastly, the reduction amount ΔPfc of the required power generation amount is calculated (step S164). This calculation is done by the formula (5) described above as in the first embodiment. Consequently, in the case that the charging capacity Win is smaller than the threshold a, as compared with the case that the charging capacity Win is equal to or larger than the threshold a, the absolute value of the reduction amount ΔPfc of the required power generation amount is set higher by the absolute value of the surplus reduction amount ΔPSfc. The processing following the step S160 (the step S170 and step S180) is the same as that of the other embodiments described above.

The vehicle 10 according to the third embodiment exhibits the same effect as that of the first embodiment. In addition, since the surplus reduction amount ΔPSfc is calculated only when the charging capacity Win is smaller than the threshold a, if the battery 35 has enough charging capacity, the reduction amount ΔPfc of the required power generation amount from the fuel cell 20 is not largely increased. Thus, the power generation amount of the fuel cell 20 is quickly increased in drastically accelerating the vehicle 10 after the slip ends. Consequently, responsiveness of the fuel cell 20 is sufficiently secured in such a situation.

E. Power Generation Control According to Fourth Embodiment

Next, the power generation control according to a fourth embodiment is described hereinafter. The vehicle 10 according to the fourth embodiment has the hardware configuration shown in FIG. 1 and part of the processing routine of the power generation amount control is different from that of the first embodiment. In the fourth embodiment, the reduction amount ΔPfc of the required power generation amount calculated in the step S160 in FIG. 2 is calculated by the processing shown in FIG. 6. The processing other than the step S160 is the same as that of the first and second embodiments. In the fourth embodiment, in order to obtain the reduction amount ΔPfc of the required power generation amount, it is determined by a method described in the third embodiment whether the calculation of the reduction amount ΔPfc of the required power generation amount using the transfer functions described in the second embodiment should be executed.

Figure 6:
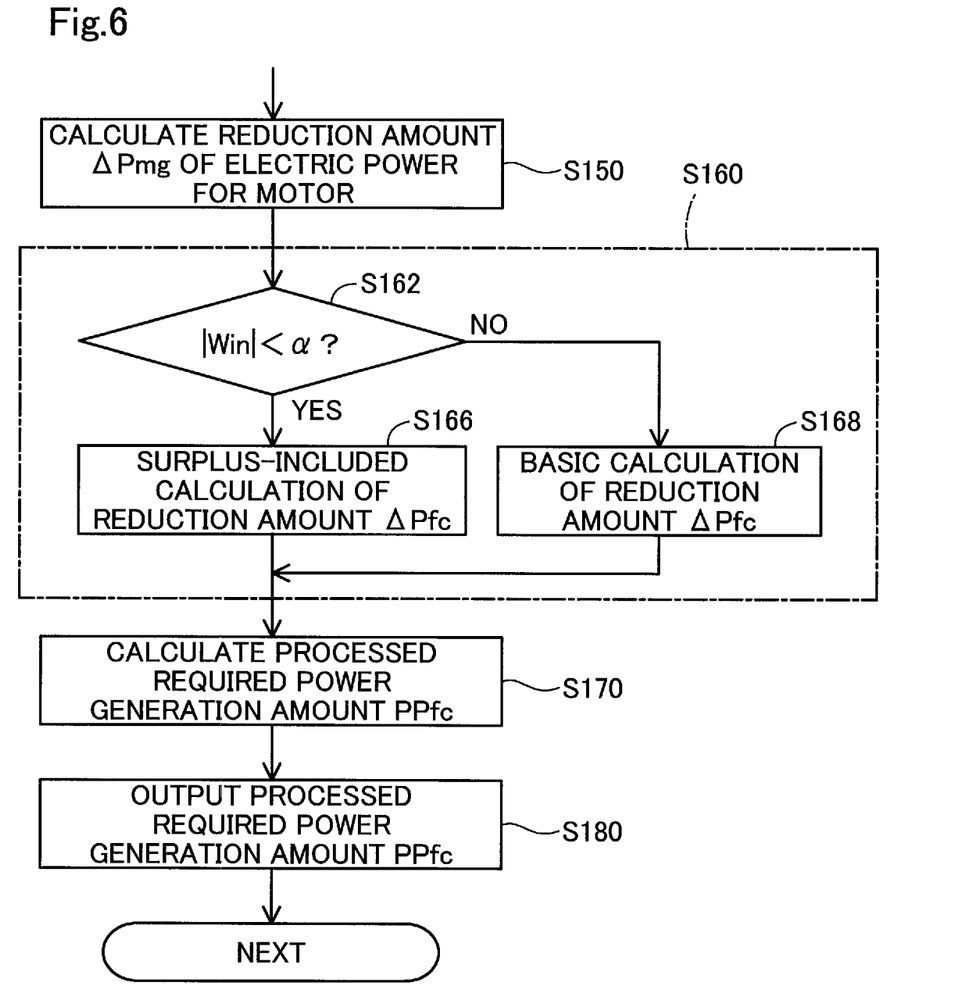
FIG. 6 is a flowchart illustrating a major part of a processing routine of power generation amount control in the vehicle according to a fourth embodiment.

More specifically, in the fourth embodiment, after obtaining the reduction amount ΔPmg of the electric power for the motor (step S150), the proceeding for obtaining the reduction amount ΔPfc of the required power generation amount (step S160) is performed as described below. First of all, it is determined whether the absolute value of the charging capacity Win indicating the available amount in the battery 35 is smaller than the threshold a (step S162). If the absolute value of the charging capacity Win is smaller than the threshold a, the processing for calculating the reduction amount ΔPfc of the required power generation amount including the surplus reduction amount is executed (step S166). A surplus-included calculation of the reduction amount ΔPfc of the required power generation amount is the processing for obtaining the reduction amount ΔPfc of the required power generation amount by the formula (8) using the transfer functions as in the second embodiment. Meanwhile, if the absolute value of the charging capacity Win is equal to or larger than the threshold a, the processing for obtaining the reduction amount ΔPfc of the required power generation amount by a basic calculation is executed (step S168). The basic calculation is the processing for obtaining the reduction amount ΔPfc of the required power generation amount from the reduction amount ΔPmg of the electric power for the motor as it is.

Consequently, in the case that the absolute value of the charging capacity Win is smaller than the threshold a, as compared with the case that the absolute value of the charging capacity Win is equal to or larger than the threshold a, the absolute value of the reduction amount ΔPfc of the required power generation amount is set higher by the amount corresponding to the overall transfer function (τfcs+1)/(τmgs+1). The processing following the step S160 (the step S170 and step S180) is the same as that of the other embodiments described above.

The vehicle 10 according to the fourth embodiment exhibits the same effect as that of the first embodiment. In addition, since the absolute value of the reduction amount ΔPfc of the required power generation amount is increased only when the absolute value of the charging capacity Win is smaller than the threshold a, if the battery 35 has enough available charging capacity, the absolute value of the reduction amount ΔPfc of the required power generation amount from the fuel cell 20 is not largely increased. Thus, the power generation amount of the fuel cell 20 can be quickly increased in drastically accelerating the vehicle 10 after the slip ends. Consequently, responsiveness of the fuel cell 20 in such a situation is sufficiently secured.

F. Other Embodiments and Modifications

In the embodiments described above, the surplus reduction amount ΔPSfc that reduces the required power generation amount further in addition to the reduction amount ΔPfc of the required power generation amount corresponding to the reduction amount ΔPmg of the electric power for the motor is obtained by such as the formula (4), however, it is not always necessary to calculate it based on the reduction amount ΔPmg of the electric power for the motor. The surplus reduction amount ΔPSfc may be obtained as a predetermined power amount, or as an amount according to the power generation amount of the fuel cell 20 at that time.

In the embodiments described above, the occurrence of the slip is determined based on whether the slip ratio is larger than the threshold. However, it may be determined using the difference between the rotational speeds of the driven wheel 51 and the driving wheel 53 instead of the slip ratio. In addition, the control to reduce the power generation amount may be performed when the slip occurs or while the slip lasts. However, it may be performed when the occurrence of the slip is predicted. The occurrence of the slip may be predicted by behavior of the slip ratio, or based on a friction coefficient of the road surface determined by a ground sensor or the like. In the embodiments described above, the slip ratio is obtained by defining a part of wheels as the driving wheels 53 and the other part of wheels as the driven wheels 51. However, in the case that the vehicle speed is detected by the ground speed or the like, the vehicle may be configured without the driven wheels such as a four-wheel drive vehicle. In addition, it may be implemented as a two-wheel vehicle.

As to the power generator, it may be a fuel cell or a generator driven by fuel combustion. As to the storage device that can store the electric power, a condenser may be adopted as well as a battery. Alternatively, it is possible to configure the storage device by combining a flywheel and a motor generator. The power generation controller is configured to control the operation of the fuel cell 20 as well. However, the power generation controller 14 may be configured to control only the fuel cell converter 31 or the like while another ECU that controls the fuel cell operation unit 14 may take control of the operation of the fuel cell 20. On the contrary, the power generation controller 14 may be configured as the ECU that has other functions such as controlling an air conditioner not shown in the drawings and performing antiskid control. The vehicle 10 is configured such that it has only one drive motor 40. However, the drive motor 40 may be provided to each wheel or configured as a wheel motor.

The present disclosure is not limited to the embodiments described above, and may be implemented in various ways without departing from the gist of the present disclosure. For example, the technical features of any of the above embodiment corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof. The configurations implemented with hardware in the embodiments described above may partially be implemented with software. The configurations implemented with software may at least partially be implemented with a discrete circuit.

What is claimed is:

1. A vehicle comprising:
a power generator configured to generate electric power using fuel;
a power generation controller configured to control the power generator to produce a required power generation amount;
a drive motor driven by at least part of the electric power generated by the power generator and configured to drive a driving wheel of the vehicle;
a storage device configured to store surplus electric power generated by the power generator; and
a slip detector configured to detect an extent of a slip of the driving wheel,
wherein,
the power generation controller is further configured to, based on the detected extent of the slip being larger than a predetermined threshold, execute reduction processing to reduce the required power generation amount from the power generator to a reduction process-required power generation amount required from the power generator, the reduction process required power generation amount being obtained by reducing the required power generation amount by a reference reduction amount and a predetermined amount that is different from the reference reduction amount,
wherein the reference reduction amount corresponds to the reduction amount of the electric power for driving the drive motor due to the extent of the slip of the driving wheel.

2. The vehicle according to claim 1,
wherein the power generation controller is further configured to calculate the reduction amount of the required power generation amount from the power generator based on the following equation where $\Delta Pfc$ represents the reduction amount of the required power generation amount, $\Delta Pmg$ represents a reduction amount of electric power required for outputting a required drive force, $\tau fc$ represents a transfer function for the power generation amount of the power generator to the reduction amount of the required power generation amount from the power generator, $\tau mg$ represents a transfer function for an actual torque of the drive motor to the reduction amount of the electric power for the drive motor, and s represents a parameter of Laplace Transformation:

$$\Delta Pfc = \Delta Pmg \times (\tau fc(s)+1)/(\tau mg(s)+1).$$

3. The vehicle according to claim 1, further comprising a charging capacity detector configured to obtain a charging capacity available in the storage device, wherein
the power generation controller is further configured to execute the reduction processing of the power generation amount if the charging capacity is smaller than a predetermined charging capacity threshold.

4. The vehicle according to claim 1,
wherein the power generation controller is further configured to execute the reduction processing of the power generation amount for at least one of following time periods:
[1] a time period that the slip detector detects the slip of the driving wheel;
[2] a predetermined time period after the slip detector detects the slip of the driving wheel; and
[3] a time period when the power generation controller predicts that the slip detector will detect the slip of the driving wheel.

5. The vehicle according to claim 1,
wherein the slip detector comprises
a vehicle body speed detector configured to detect vehicle body speed of the vehicle and
a rotational speed detector configured to detect rotational speed of the driving wheel, and
wherein the extent of the slip is obtained from a difference between the rotational speed of the driving wheel consistent with the detected vehicle body speed and the detected rotational speed of the driving wheel.

6. A method for controlling a power generation amount of a power generator disposed on a vehicle, the method comprising:
controlling the power generator to produce a required power generation amount;
driving a drive motor configured to drive a driving wheel of the vehicle using at least part of electric power generated by the power generator according to the required power generation amount;
storing surplus electric power generated by the power generator in a storage device;
detecting whether a slip larger than a predetermined threshold occurs in the driving wheel; and
executing reduction processing, based on the detected slip being larger than the predetermined threshold, to reduce the required power generation amount from the power generator to a reduction process required power generation amount required from the power generator, the reduction process required power generation amount being obtained by reducing the
required power generation amount by a reference reduction amount and a predetermined amount that is different from the reference reduction amount,
wherein the reference reduction amount corresponds to the reduction amount of the electric power for driving the drive motor due to the extent of the slip of the driving wheel.

* * * * *